United States Patent
Goetzen et al.

(10) Patent No.: US 9,997,755 B2
(45) Date of Patent: Jun. 12, 2018

(54) SEPARATOR COMPRISING A POROUS LAYER AND METHOD FOR PRODUCING SAID SEPARATOR

(71) Applicant: Sihl GmbH, Dueren (DE)

(72) Inventors: Klaus Goetzen, Vettweiss (DE); Axel Niemoeller, Dueren Niederau (DE); Manfred Schaefer, Cologne (DE)

(*) Notice: Subject to any disclaimer, the term of this patent is extended or adjusted under 35 U.S.C. 154(b) by 475 days.

(21) Appl. No.: 14/373,158

(22) PCT Filed: Jan. 21, 2013

(86) PCT No.: PCT/EP2013/051063
§ 371 (c)(1),
(2) Date: Jul. 18, 2014

(87) PCT Pub. No.: WO2013/107911
PCT Pub. Date: Jul. 25, 2013

(65) Prior Publication Data
US 2015/0030933 A1  Jan. 29, 2015

(30) Foreign Application Priority Data
Jan. 19, 2012 (DE) .................. 10 2012 000 910

(51) Int. Cl.
*H01M 2/16* (2006.01)
*H01M 10/0525* (2010.01)
*C08K 3/22* (2006.01)
*C09D 153/00* (2006.01)
*H01M 2/14* (2006.01)

(52) U.S. Cl.
CPC .............. *H01M 2/166* (2013.01); *C08K 3/22* (2013.01); *C09D 153/00* (2013.01); *H01M 2/145* (2013.01); *H01M 2/1646* (2013.01); *H01M 2/1666* (2013.01); *H01M 2/1686* (2013.01); *H01M 10/0525* (2013.01); *C08K 2003/2227* (2013.01)

(58) Field of Classification Search
CPC ...... H01M 2/16; H01M 10/0525; H01M 2/14; H01M 2/1646; H01M 2/166; H01M 2/1686; H01M 2/145; H01M 2/1666; C08K 3/22; C09D 153/00
See application file for complete search history.

(56) References Cited

U.S. PATENT DOCUMENTS

| | | | |
|---|---|---|---|
| 6,153,337 A | 11/2000 | Carlson et al. | |
| 6,277,514 B1 * | 8/2001 | Ying | H01M 2/16 429/129 |
| 6,723,467 B2 | 4/2004 | Yoshida et al. | |
| 6,846,435 B1 | 1/2005 | Bohnen et al. | |
| 2001/0000485 A1 * | 4/2001 | Ying | H01M 2/16 429/228 |
| 2006/0046149 A1 * | 3/2006 | Yong | H01M 2/166 429/251 |
| 2010/0183907 A1 * | 7/2010 | Hauser | H01M 2/166 429/142 |
| 2011/0052987 A1 * | 3/2011 | Katayama | H01M 2/1646 429/221 |
| 2011/0239446 A1 * | 10/2011 | Morishima | H01M 4/0404 29/623.5 |
| 2012/0231323 A1 | 9/2012 | Takagi et al. | |

FOREIGN PATENT DOCUMENTS

| | | |
|---|---|---|
| CN | 1239591 A | 12/1999 |
| CN | 101002347 A | 7/2007 |
| JP | 2004146106 A | 5/2004 |
| JP | 2011206765 A | 10/2011 |
| WO | 0103824 A1 | 1/2001 |
| WO | 2011013604 A1 | 2/2011 |
| WO | 2011062285 A1 | 5/2011 |

OTHER PUBLICATIONS

JP 5598472MT.*
Decision to grant a Patent for Application No. 2014-552653 issued by JPO on Sep. 26, 2017,MT.*
Office Action for Application No. 201380006212.4(Chinese counterpart of the instant Application, Translation) issued by SIPO dated Aug. 31, 2017,MT.*
WO 2010138179.*
Zhang, Sheng Shui, "A Review on the Separators of Liquid Electrolyte Li-ion Batteries", Journal of Power Sources 164, 2007, pp. 351-364.
Baldwin, Richard S. et al, "Battery Separator Characterization and Evaluation Procedures for NASA's Advanced Lithium-Ion Batteries", National Aeronautics and Space Administration, Glenn Research Center, Cleveland, Ohio, May 2010, 50 pgs.
English language PCT International Search Report dated May 6, 2013, received in corresponding PCT Application No. PCT/EP13/51063, 2 pgs.
PCT English translation of the International Preliminary Report on Patentability dated Jul. 31, 2014, received in corresponding PCT Application No. PCT/EP13/51063, 10 pgs.

* cited by examiner

*Primary Examiner* — Alex Usyatinsky
(74) *Attorney, Agent, or Firm* — Grossman, Tucker, Perreault & Pfleger, PLLC

(57) ABSTRACT

The present invention relates to a separator for an electrochemical cell, preferably a lithium ion battery, comprising a porous layer which comprises at least one block copolymer having three or more polymer blocks and at least one aluminum oxide or hydroxide, a lithium ion battery comprising such a separator, and a method for producing such a separator.

20 Claims, No Drawings

SEPARATOR COMPRISING A POROUS LAYER AND METHOD FOR PRODUCING SAID SEPARATOR

The present invention relates to a separator for an electrochemical cell, preferably a lithium ion battery, comprising a porous layer which comprises at least one block copolymer having three or more polymer blocks and at least one aluminum oxide or aluminum hydroxide, to a lithium ion battery comprising such a separator, and to a method for producing such a separator. The finely porous layer of the separator comprises at least one block copolymer as binder and as main constituent an aluminum oxide or hydroxide, e.g., boehmite. Separators based on such a layer are notable in particular for rapid fluid uptake, high porosity, high mechanical strength, and very low contraction under thermal load. A substantial improvement in the safety of lithium ion batteries customary today is therefore possible. Furthermore, the separators can also be produced on a commercial scale in an inexpensive coating process.

Lithium ion batteries are widespread, such as in cell phones, laptop computers, and electrically operated tools. Recently, however, safety risks of such batteries have increasingly become known, leading to the explosive destruction of the batteries. On the other hand, the lithium ion technology appears predestined for batteries of future electric vehicles, on account of the high energy density and power associated therewith. A vital requirement for the propulsion technology of future electrical vehicles, however, are inexpensive and reliable components.

Separators are porous elements, customarily in the form of films, for separating the chemical reactions at anode and cathode in a battery, and are a key safety element for preventing a short circuit in the batteries. Known from the prior art are separators which are applied as a coating directly to the anode and/or cathode, and also self-supporting separators, which are not applied as a coating to one of the electrodes, but instead constitute an independent component of the battery.

The requirements imposed on a stable, safety-ensuring separator are diverse and include a very low thickness, effective electrical insulation in tandem with high ion transport, high tensile strength and stretchability, electrochemical stability, high porosity with defined pore diameter, effective wettability with organic electrolytes, chemical and mechanical resistance even at high temperatures, and dimensional stability.

Existing separators often consist of meltable plastics, which are either cast or extruded to form films. In order to generate fine pores in these plastics, they are stretched, with the plastics tearing and a porosity of 30-60% being generated. Customary separators include those based on polypropylene (melting point about 160-165° C.), polyethylene (melting point about 110-135° C.) or blends thereof. Also known are porous plastics separators based on PVDF (polyvinylidene fluoride), from US 2010/0183907, for example.

A serious drawback of such polyolefin separators is their low thermal robustness even at temperatures below 150° C. Even temporary attainment of the melting point of the polymers results in the melting of the separator and may lead, as a result of the associated contraction, to a short circuit in the electrochemical cell, meaning that such separators cannot be classed as safe.

Also known, furthermore, are separators based on inorganic nonwovens, such as nonwovens made from glass or ceramic materials, for example, or else ceramic papers. These separators, while being temperature-stable, are often mechanically nonresistant, thereby shortening the lifetime of corresponding batteries.

Diverse attempts have been undertaken in the prior art to combine the properties of separators based on organic polymers with those of separators based on inorganic materials. Known from the prior art, accordingly, for example, are separators which comprise a mixture of a polymer such as polyvinyl alcohol (PVA) or polyvinylidene fluoride (PVDF) and an inorganic pigment, such as silica or aluminum oxide, for example, from U.S. Pat. No. 6,153,337 B1 and U.S. Pat. No. 6,723,467 B2, for example.

The separators known to date from the prior art, however, always represent only a compromise between the various desired properties, such as ion conductivity, strength, stretchability, contraction behavior, temperature stability, chemical inertness, and inexpensive production, for example. PVA-based binders, for example, are not suitable for providing long-lived and chemically inert separators. Separators with PVDF-based binders are indeed more chemically inert, but are also substantially more expensive to produce.

It was an object of the present invention, therefore, to provide a separator for electrochemical cells that has a high porosity, a high dimensional stability/low thermal contraction even at temperatures above 150° C. and good mechanical stability, more particularly a high elongation at break, and at the same time can be produced inexpensively both as a self-supporting separator and as an electrode coating.

This object is achieved by the separator and the method for producing a separator of the present invention.

The present invention relates to a separator for an electrochemical cell, preferably a lithium ion battery, comprising a porous layer which comprises a block copolymer having three or more polymer blocks and an aluminum oxide or aluminum hydroxide, the weight ratio of aluminum oxide or hydroxide to block copolymer being in the range from 1.5:1 to 20:1.

The weight ratio of aluminum oxide or hydroxide to block copolymer is preferably in the range from 1.75:1 to 20:1, more preferably from 2:1 to 20:1, very preferably from 2.25:1 to 10:1 and more particularly from 2.5:1 to 8:1.

Surprisingly it has been found that the separators of the invention, which comprise or consist of such a layer, are notable for a high porosity, a high dimensional stability/low thermal contraction even at temperatures above 150° C., and a high elongation at break of at least 5%. This is all the more surprising since these properties, at any rate in combination, cannot be achieved with the binder systems known from the prior art and based on polyvinyl alcohol, random copolymers, or diblock copolymers.

Moreover, the separators of the invention also exhibit rapid wetting of their surface with electrolyte solution and fast penetration of this electrolyte solution into the separator (liquid uptake), and also very good mechanical properties, such as tensile strength and modulus of elasticity in accordance with ASTM 882-02 (ASTM D-638), and also a high electrochemical stability.

In the present invention, therefore, success has been achieved in combining the advantages of the aluminum oxide/hydroxide used as main constituent—a temperature-stable, porous, inorganic compound—with those of the polymer, including the high elongation at break and the possibility of an inexpensive production method for separators.

Melting or deformation of the predominantly inorganic porous layer does not occur even at temperatures up to 150°

C., more particularly up to 200° C. The safety of lithium batteries can therefore be enhanced by using the separator of the invention.

The separator of the invention can be inexpensively produced by the method of the invention, using known devices, such as metering rod, airbrush or low-pressure rolls, for example, nozzle coating or curtain coating, and the method can be easily varied according to requirements and so adapted to specific requirements for the respective separator.

The term "electrochemical cell" in the sense of the present invention embraces batteries, including accumulators (secondary batteries), of any kind, such as, for example, alkali metal batteries and alkaline earth metal batteries, more particularly lithium ion batteries.

The term "block" in the sense of the invention refers to a section of a polymer molecule that comprises a plurality of identical constitutional units (monomers) and possesses at least one constitutional or configurative feature that does not appear in the immediately adjacent sections (blocks). In the sense of the invention, the term "block copolymer having three blocks" encompasses linear and star-shaped polymers having the general construction $(A)_m (B)_n (C)_o$, in which A, B and C represent the different monomers, and m, n, and o represent the number of repeating units in the individual blocks. $(A)_m$ and $(C)_o$ are identified in this case as end blocks/terminal blocks, and may have the same or a different monomer composition and/or molar mass (indicated as the number of monomer units m and o). $(B)_n$ is termed the middle block and differs in monomer composition from the end blocks $(A)_m$ and $(C)_o$. Each of the blocks $(A)_m$, $(B)_n$, and $(C)_o$ may in turn consist of one or more homopolymers, random or block copolymers, with random copolymers being preferred. The middle block may in turn consist of a plurality of blocks, producing block copolymers having more than 3 blocks, such as pentablock copolymers. Star-shaped block copolymers are a special form of branched block copolymers where three or more chains of the general formula $[(A)_m (B)_n]_p$ go out radially from a center (C), with $(A)_m$ and $(B)_n$ being as defined above, and p representing the number of chains, and the individual chains each able to be identical or different. These too may be used as block copolymers in the present invention.

The separators of the invention include not only separators applied as a coating directly to the anode and/or the cathode, but also self-supporting separators which are not applied as a coating on one of the electrodes, but instead represent an independent component of the battery. In both cases, as well as the layer comprising the block copolymer and the aluminum oxide or hydroxide, the separators of the invention may comprising further layers and/or materials, such as temporary or permanent support materials, for example. Suitable support materials are described in connection with the method of the invention, whereby the separators of the invention can be produced preferably both in the form of an electrode coating and as self-supporting separators. For the production of a self-supporting separator membrane, the layer which comprises the block copolymer and the aluminum oxide or hydroxide (also referred to below as pigment) may be applied preferably first to a temporary support. After drying, the coating may then be detached as a self-supporting, finely porous separator film from the temporary support. Moreover, the layer may also be applied to one or both sides of a permanent support, such as a nonwoven, a woven fabric, or a porous membrane—for example, a porous polyolefin separator—on which it remains in the separator application.

The thickness of the porous layer comprising the block copolymer and the aluminum oxide or hydroxide (referred to below as porous layer) may be preferably from 1 to 100 µm, more preferably from 3 to 50 µm, very preferably from 3 to 30 µm and more particularly from 10 to 20 µm. In self-supporting separators, especially in those which consist exclusively of the layer according to the invention and comprise no further support material, the thickness of the porous layer may be preferably from 10 µm to 50 µm. If the separator is applied directly to the electrode by coating, then the thickness of the porous layer may be preferably from 3 µm to 50 µm.

The porosity of the porous layer, measured by means of mercury porosimetry, is preferably 30% to 70%, more preferably 40% to 60%. The porosity can be varied to a certain degree by the addition of suitable pigments, dispersants, binders, solvents, crosslinkers and/or other auxiliaries. For example, increasing the fraction of binder leads generally to a lower porosity and higher mechanical strength (elongation at break, modulus of elasticity). Selecting the solvents for the coating composition allows the drying and hence the formation of a homogeneous porous structure to be influenced. In order to achieve a homogeneous, isotropic structure to the coating, there ought not to be any instances of precipitation, binder migration, and incompatibilities during drying, as the skilled person is aware. An isotropic structure/porosity is understood in the sense of the present invention to mean that the pore structure and the pore size appears uniform over the area and thickness of the separator at the magnification of a scanning electron microscope. The pore diameters, determined by mercury porosimetry (DIN 66133), have a very narrow distribution around an average value. In particular, in the pore distribution curve, the full width at half maximum is less than +/−30% of the average pore size.

As a result of the excess of pigment, evaporation of the solvent leads to a porous structure. The overall porosity is 30 vol. % to 70 vol. %, preferably 40 vol. % to 60 vol. %.

The pore diameter, also referred to as pore size, of the porous layer, determined with the aid of mercury porosimetry in accordance with DIN 66133, is preferably 10 nm to 300 nm, more preferably 50 to 200 nm.

The aluminum oxide or hydroxide preferably constitutes an oxide or hydroxide of the general formula $Al_2O_3 * x\ H_2O$ with x from 0 to 1.5. More preferably the water fraction x is from 0.8 to 1.3, determined in each case after drying of the pigment at 150° C. for 2 hours by thermogravimetry, the material being heated to at least 700° C., preferably to 1150° C., at 2° C. per minute. This includes aluminum oxides and hydroxides which are referred to as alpha- or gamma-aluminum oxide/hydroxide and may be present in various crystal modifications, more particularly as boehmite, pseudoboehmite, diaspor, gamma-alumina, or alpha-aluminum oxide or have an amorphous structure. The oxides and/or hydroxides used in the method of the invention may in turn be prepared by a variety of processes, and are also available commercially. Preferred, for example, is boehmite, which is prepared in a sol-gel process in a manner such as to generate fine crystallites, aggregated to form superordinate structures, with a platelet-shaped, acicular, or blocklike primary structure, for example. These structures possess a high porosity and hence a high surface area. The typical crystallite size, which may be determined roentgenographically, is preferably from 5 to 200 nm, preferably from 20 to 100 nm. For the measurement of the crystallite size, powder samples are analyzed by X-ray structural analysis (XRD, Siemens D5000 or Philips X'Pert). The crystallite size may be determined from the diffractogram (120 plane). The porosity of these primary structures, determined by means of mercury porosimetry in accordance with DIN 66133, is preferably in the range from 0.3 ml/g to 1.3 ml/g. The BET surface area of these primary structures is preferably in the range from 10 m$^2$/g to 250 m$^2$/g. For the measurement of the BET surface areas, the samples are first calcined at 550° C. for 3 hours and then analyzed by low-temperature nitrogen adsorption in line with the BET method. An example of a suitable instrument is a Micromeritics Gemini 2360. Block-shaped and platelet-shaped primary particles are especially suitable. These primary particles may have undergone aggregation to form a secondary structure. The resulting secondary particles preferably have a particle size of 50 nm to 2000 nm, preferably of 100 nm to 500 nm.

Additionally suitable are particle-form aluminum oxides and hydroxides of the kind obtainable for example by gas-phase operations (pyrogenic aluminum oxide/fumed alumina), precipitation operations, or grinding operations, which are familiar to the skilled person. Depending on the process, various crystal structures are formed, or else amorphous aluminum oxide. Important in the selection of the pigments is the structure of their particles, which have platelet-shaped, acicular or block-shaped construction and, as far as possible, an internal porosity. Spherical particles are suitable only when they form secondary structures which lead to a porous pigment structure. Extremely fine dispersibility of the particles in a solvent is a further desirable feature. Another desirable feature is an extremely narrow particle size distribution. Suitable aluminum oxides/hydroxides are available commercially.

For use as a separator in lithium ion batteries, another requirement is high purity in the aluminum oxide/hydroxide. The fraction of impurities with other elements in the aluminum oxide/hydroxide used is therefore preferably less than 50 ppm, based on the pigment particles.

In order to enhance their dispersibility in solvents, the surface of the aluminum oxide or hydroxide particles is preferably modified. This may be achieved by adding a dispersant; depending on the dispersant and solvent, the predominant stabilization of the pigment particles may be ionic or steric. Stable dispersions allow the production of homogeneously porous and defect-free separators from the aluminum oxides/hydroxides described. For the combination with block copolymers as binders, which are soluble in organic solvents, the pigment surface is modified preferably by organic or inorganic acids or by silanes. These acids may be applied during the production of the aluminum oxide/hydroxide pigment, in a sol-gel operation, for example, or in the course of grinding, or may be used subsequently when the dried pigment is dispersed. The aluminum oxide or hydroxide is therefore preferably modified by treatment with at least one substance selected from the group containing organic compounds containing carboxylic and/or sulfonic acid, inorganic acids, silanes, or mixtures thereof.

Suitable monobasic or polybasic organic carboxylic acids or organic sulfonic acids may preferably comprise, for example, branched or unbranched acids containing alkyl groups or containing alkylaryl groups, such as, for example, branched and unbranched alkylarylsulfonic acids, branched and unbranched, linear and cyclic alkylsulfonic acids, branched and unbranched, linear and cyclic, aliphatic and aromatic monocarboxylic, dicarboxylic, and polycarboxylic acids. Additionally suitable and likewise preferred are fluorine-containing acids, including perfluorinated organic acids, and also amidosulfonic acids.

Examples of such compounds are propionic acid, butyric acid, pentanoic acid, dodecylic acid, methanesulfonic acid, dodecylsulfonic acid, para-toluenesulfonic acid (PTS), para-dodecylbenzenesulfonic acid (DBS), trifluoroacetic acid, perfluoroalkanoic acids, diacids such as lactic acid, polycarboxylic acids such as polyacrylic acid, or polysulfonic acids such as polystyrenesulfonic acid.

Using organic acids having more than 3 C atoms leads to improved steric stabilization of the particles in polar organic solvents. In aqueous or alcoholic systems, short-chain organic acids or inorganic acids are preferred, examples being acetic acid, formic acid, hydrochloric acid, nitric acid, phosphoric acid, sulfuric acid, amidosulfonic acid, hydrofluoric acid, tetrafluoroboric acid, hexafluorophosphoric acid, bisoxalatoboric acid, perchloric acid, lactic acid, and citric acid.

Preference is given to using strong acids such as PTS or DBS, PTS preferably for dispersing in polar organic solvents, DBS preferably for dispersing in apolar solvents.

Dispersing can be optimized by varying the amount of the organic acid used. Typical amounts are situated in the range between 1 wt % and 20 wt %, based on the weight of the pigment. The greater the surface area of the pigment, the greater the amount of dispersant that should generally be used.

The surface of the pigment particles may alternatively be modified with silanes. Suitable for this purpose are compounds of the general formula: $SiR^1R^2R^3R^4$, in which at least one of the radicals ($R^1$) represents an alkoxy group, e.g. methoxy, ethoxy, propoxy, etc., allowing attachment to the pigment surface by transesterification. The radicals $R^2$ and $R^3$ may be identical or different and are preferably selected from alkyl, aryl, or alkoxy groups. The radical $R^4$ preferably represents an alkyl or aryl group. Preferred silanes are, for example, dimethyldimethoxysilane, methyltrimethoxysilane, trimethylmethoxysilane, phenylmethyldimethoxysilane, phenyltrimethoxysilane, dodecyltrimethoxysilane, dodecyldimethylmethoxysilane, 3-glycidyloxypropyltrimethoxysilane, vinyltrimethoxysilane, and methylvinyldimethoxysilane, but are not restricted to these.

For the modification of the pigment surface with silanes there are a variety of methods known from the prior art, examples being modification in alcoholic or aqueous solution, modification by sprayed application to the pulverulent pigment with subsequent high-intensity mixing, or modification in anhydrous organic phase using anhydrous organic solvents such as toluene, xylene, THF, or other hydrocarbons, for example. The pigment in this case is first subjected to preliminary drying and is then heated at reflux for a number of hours in the solvent, to which silane has been added.

Furthermore, mixtures of the pigment particles described above can also be used.

The block copolymer having three or more blocks functions as a binder in the porous layer of the separator of the invention. Block copolymers of this type have, surprisingly, proven particularly advantageous in the setting of the aluminum oxide and hydroxide pigments used in accordance with the invention, allowing a high porosity and a high elongation at break to be achieved in the porous layer. They are also termed thermoplastic elastomers.

In contrast to random polymers and copolymers, these block copolymers preferably have a pronounced phase separation behavior. Hence they form microphases, where in general the phase with the lower proportion is dispersed in the other phase. Lamellar structures as well are possible. The structures are dependent on factors including the size and molar mass of the blocks, the solvents used, and the other components present in the coating, such as further polymers or resins, for example.

Preference is given to using block copolymers which are present as a multiphase system—a two-phase system, for example—where the end blocks form a harder phase and the middle blocks form a softer and therefore more flexible phase. Preference is therefore given to using block copolymers in which the end polymer blocks have a higher glass transition temperature ($Tg_E$) than the middle polymer block or blocks ($Tg_M$). $Tg_E$ is preferably more than 70° C. and not more than 250° C., determined according to ISO 11357-2: 1999. The glass transition temperature of the middle polymer block or blocks, $Tg_M$, is preferably less than 70° C., more preferably less than 20° C., and very preferably less than 0° C., and is at least −80° C. This ensures that the end blocks form a phase with high temperature stability in the separator layer, as a result of the phase separation, and at the same time the middle blocks contribute to the flexibility of the separator layer. This kind of phase separation is achievable only with block copolymers having three or more blocks.

The middle block copolymer or copolymers, furthermore, are preferably not soluble in typical battery electrolytes for lithium ion batteries, such as a 1:1 mixture of ethylene carbonate and dimethyl carbonate with 1 mol/l lithium hexafluorophosphate, for example, at temperatures up to 60° C. This means that the full dissolution of one gram of the block copolymers including the middle blocks would require more than 1 liter of the solvent in question.

Based on the overall polymer, the molar mass of the block copolymer is preferably more than 50 000 g/mol (weight average), more preferably more than 100 000 g/mol. The block copolymer preferably has a narrow molar mass distribution (uniform molar mass). The high molar mass is synonymous with a very low ISO 1133 melt flow index for these block copolymers. Preferred block copolymers have a melt flow index of less than 3 g/10 min at 230° C. (5 kg), preferably less than 1 g/10 min. Triblock copolymers of this kind allow a sharp improvement in the mechanical strength of the block copolymers.

The chemical composition of the block copolymers here is variable within wide ranges. For instance, even the individual polymer blocks may in turn consist of copolymers, especially the middle block. The weight fraction of all of the end blocks is preferably in the range from 10 wt % to 60 wt %, preferably from 20 wt % to 40 wt %, based on the total weight of the block copolymer. If the fraction is lower, effective phase separation cannot be expected in general; if the fraction is significantly higher than 60 wt %, the properties of the end block become predominant, and so the elastomeric properties of the middle block or middle blocks are not manifested.

Preferred as monomers in the blocks of the block copolymers are the following monomer units: methyl (meth)acrylates, ethyl (meth)acrylates, n-propyl (meth)acrylates, n-butyl (meth)acrylates, tert-butyl (meth)acrylates, n-hexyl (meth)acrylates, 2-phenoxyethyl (meth)acrylates, decyl (meth)acrylates, 2-ethylhexyl (meth)acrylates, hexyl (meth)acrylates, hexadecyl (meth)acrylates, isobutyl (meth)acrylates, isopropyl (meth)acrylates, octadecyl (meth)acrylates; propyl (meth)acrylates, tetradecyl (meth)acrylates, vinyl benzoates, hydroxyethyl (meth)acrylates, acrylic acid, methacrylic acid, crotonic acid, isocrotonic acid, maleic acid, maleic anhydride, styrene, methylstyrene, butylstyrene, propylstyrene, 4-tert-butoxystyrene, 4-tert-butylstyrene, 2,5-dimethylstyrene, 2-methoxystyrene, ethylene, propylene, butylene, isoprene, butadiene, 1-hexene, ethylene oxide, and propylene oxide.

The selection of the monomers is used to control the "incompatibility" of the end blocks with the middle block or middle blocks, leading to the formation of the multiphase structure in the block copolymer. Suitable middle blocks are, in particular, polyolefin polymers or polyolefin copolymers. These polymers have a glass transition temperature of below 70° C., preferably below 20° C., and more preferably below 0° C. Suitable examples of polymers "incompatible" with these are polymers composed of monomer units selected from the group containing acrylic acid, methacrylic acid, methyl methacrylate, hydroxyethyl (meth)acrylate, methyl acrylate, alpha-methylstyrene, styrene, or 4-tert-butylstyrene.

Where the middle blocks comprise an acrylate of low glass transition temperature, e.g., butyl acrylate, styrene or methyl methacrylate are suitable examples of monomer units for the end blocks. Triblock copolymers of this kind are available under the trade name Nanostrenght® from Arkema (Colombes, France), for example. Other examples of suitable combinations are block copolymers of acrylic acid-ethylene-acrylic acid, methyl methacrylate-ethylene oxide-methyl methacrylate, and also triblock copolymers having three different blocks, such as methyl methacrylate-butadiene-styrene, for example.

The end blocks may in particular contain styrene units. Examples of such triblock polymers are styrene-isoprene-styrene triblock copolymer (SIS), styrene-butadiene-styrene triblock copolymer (SBS), styrene-ethylene/propylene-styrene triblock copolymer (SEPS), styrene-ethylene/butene-styrene triblock copolymer (SEBS), or styrene-ethylene/ethylene/propylene-styrene triblock copolymer (SEEPS). The two latter polymers may be obtained, for example, by hydrogenating unsaturated copolymers of isoprene and butadiene. Such polymers are available commercially, under the trade names Kraton® (Kraton Polymers, Houston, Tex., USA), Cariflex® (Kraton Polymers) and Septon® (Kuraray Co. Ltd, Tokyo, Japan), for example. Diblock copolymers which are likewise obtainable under these designations display significantly lower mechanical strength when used as binders for separators in the form of triblock copolymers. It is therefore necessary for a flexible middle block to be bonded to two or, in the case of star-shaped block copolymers, three or more terminal end blocks, in order to achieve good mechanical properties such as high elongation at break and a high modulus of elasticity.

An example of a suitable pentablock copolymer is available under the brand name Nexar® (Kraton Polymers). It consists of five blocks, with the construction tert-butylstyrene-ethylene/propylene-sulfonated styrene-ethylene/propylene-tert-butylstyrene.

The block polymer may optionally also be crosslinked, before, during, or after the drying of the porous layer in its production, for example. Crosslinking of the block copolymer may be accomplished by chemical methods, as through the incorporation of reactive groups into the block copolymer, for example, with the aid of a crosslinker, or by radiation techniques (UV curing, electron beam curing), preferably principally between the end blocks or principally in the middle blocks. For this purpose, the end or middle blocks of the block copolymers of the invention may be chemically modified, or crosslinkable/reactive groups may be introduced by copolymerization into the blocks in question, such as diacrylates and triacrylates, for example. Preferred block copolymers are those comprising crosslinkable groups in the end blocks. Examples of such block copolymers are those of the SEEPS and SEBS type from the Septon® V series, which are radically crosslinkable via organic peroxides or by means of UV radiation or electron bombardment. A further example are triblock copolymers of methyl methacrylate-butylacrylate-methyl methacrylate containing a polar comonomer in the polymethyl methacrylate end blocks (available commercially, for example, as Nanostrength® Functional MAM block copolymers). These comonomer units may then be linked by addition of crosslinking agents such as anhydrides, or by thermal cationic crosslinking, allowing a three-dimensional polymer network to be built up via the end blocks. In a similar way, the middle blocks may be crosslinked as well, by electron bombardment or else thermally by means of peroxides, for example.

Mixtures of the above-described polymers may also be used, furthermore.

The separator of the invention may be designed as a self-supporting separator with a self-supporting porous layer. The modulus of elasticity of the self-supporting porous layer in this case is preferably greater than 50 N/mm$^2$, more preferably greater than 100 N/mm$^2$, and/or the elongation at break is greater than 5%, more preferably greater than 10%, and very preferably greater than 20%.

Alternatively the separator of the invention may also be applied on a substrate, which is preferably selected from the group containing anodes, anode material, cathodes, cathode material, porous support materials, such as microporous plastics separators, nonwovens, or mixtures thereof.

These alternative embodiments are described in more detail below, in connection with the production method of the invention.

The separators of the invention are produced preferably by the method described hereinbelow. The present invention accordingly further relates to a method for producing a separator for an electrochemical cell, preferably a separator as described above, which comprises the production of a porous layer comprising at least one block copolymer having three or more polymer blocks and at least one aluminum oxide or aluminum hydroxide, with the following steps:

i. providing a coating composition comprising at least one solvent, a dispersion of aluminum oxide or hydroxide particles in this solvent, and a solution of the block copolymer,
ii. applying the coating composition to a substrate, to give a coating on said substrate, and
iii curing the coating by evaporating the solvent and optionally crosslinking the polymer.

Aluminum oxide or hydroxide particles used are preferably those described above. Block copolymer used are preferably the above-described block copolymers having three or more blocks.

Solvents suitable are, in particular, those having a boiling point of about 60° C. to about 250° C., such as water, alcohols, esters, ethers, ketones, amides, and aliphatic and aromatic, optionally halogenated solvents, more particularly hydrocarbons of this kind. Particularly preferred are methanol, ethanol, isopropanol, n-propanol, butanol, diethyl ether, propylene monomethyl ether, acetone, methyl ethyl ketone, methyl isobutyl ketone, ethyl acetate, butyl acetate, N-methylpyrrolidone, N-ethylpyrrolidone, dimethylacetamide, toluene, xylene, benzene, hexane, heptane, benzines with defined boiling range, and mixtures thereof. Benzines with defined boiling range are, for example, extraction spirit/C7 (boiling range 65-100° C.), cleaning spirit/C8 (boiling range 100-140° C.), white spirit/C9 (boiling range 140-185° C.), etc. In order to optimize the solubility and evaporation properties, solvent mixtures are particularly suitable.

In order to achieve a high level of porosity and a uniform layer structure, the aluminum oxide/hydroxide pigments ought to be present as fine particles in dispersion in the solvent, and the binder ought to be in solution in this solvent. In accordance with the solubility of the selected block copolymer and with the optimum dispersing of the pigment particles, it is advantageous, by using a solvent suitable for this purpose, to prepare a solution of the block copolymer, to carry out preliminary dispersing of the pigments in a suitable solvent, which may be different from the first solvent, and then to perform the mixing of these components, with the consequent solvent mixture resulting from the compositions to of the individual components.

For this purpose a pigment dispersion in solvent is first prepared, by dispersing the pigment in the solvent with dispersant and with stirring. High shearing forces are useful to disrupt the pigment particles adhering to one another. Agitator ball mills or dispersing disks are examples of apparatus suitable for this purpose. A solution of the binder is then added to the finely dispersed pigment mixture. When selecting the solvents it should be ensured that no incompatibilities occur that may lead to instances of precipitation. Suitable solvent mixtures can be determined by the skilled person in simple preliminary tests.

The pigment to binder weight ratio is in the range from 1.5:1 to 20:1, preferably in the range from 1.75:1 to 20:1, more preferably from 2:1 to 20:1, very preferably from 2.25 to 10:1, and more particularly from 2.5 to 8:1, both in the dispersion and in the porous layer. The ratio may be optimized in order to achieve a combination of very high mechanical strength on the part of the separator with high porosity at the same time. The fraction of the solid can be varied in order to ensure the solubility of the block copolymer and/or the stability of the dispersion, and/or to adjust the viscosity of the solution.

The particle size of the dispersed particles is preferably in the range from 50 nm to 2000 nm, more preferably from 100 nm to 500 nm. This may be achieved by a suitable surface covering of the pigment particles with dispersant, producing a stable dispersion by stirring or grinding of secondary or primary particles. The particle size is measured by laser diffraction on diluted boehmite sols by the MIE method with a Beckmann Coulter LS instrument.

The coating dispersion (and hence also the separator obtained from it) may comprise further constituents. In particular, a part of the block copolymer, which acts as binder, may be replaced by materials which are "compatible", in other words miscible, with the end blocks or with the middle blocks. Suitable for this purpose are homopolymers, copolymers, or resins which accumulate in one of the phases on the phase separation when the coating is dried, in other words accumulating either in the end blocks or the middle blocks. Examples of materials which accumulate in the phase of the end blocks are polystyrene in the case of an SEBS block copolymer, or polymethyl methylacrylate in the case of methyl methacrylate-butyl acrylate-methyl methacrylate block copolymers. Accumulation in the middle blocks of an SIS copolymer may be achieved, for example, with a polyisoprene resin which is liquid at room temperature (23° C.) and atmospheric pressure (1.01325 bar/1013.25 hPa).

Furthermore, up to 5 wt %, based on the porous coating after drying, i.e., after evaporation of the solvent, of auxiliaries may be used in order to optimize the coating operation and/or to modify the properties of the coating. Examples of such auxiliaries are wetting assistants, e.g., fluorinated nonionic surfactants, of the kind available, for example, under the trade name Capstone® (DuPont, Wilmington, Del., USA), defoamers, e.g. silicones, thickeners, e.g. polyurethane thickeners, polyacrylate thickeners, or cellulose derivatives. Examples of other suitable auxiliaries include antioxidants or UV stabilizers.

The pigment dispersion with the binder admixed may be applied as a coating to a support material by means of known methods. Examples of those suitable for this purpose include roll application methods with metering rod, airbrush, or low-pressure rolls, or end-metered methods such as nozzle coating or curtain coating, for example. The coatweight here is selected so as to obtain the desired layer thickness of the dried separator. Coating here may also take place multiply. The preferred thickness for the layer has already been described above.

Subsequently, the liquid coating on the support material is dried. Hot air ovens and driers with hot air fans are suitable examples for this purpose. The solvent ought to be completely evaporated. In this operation, the dried porous separator layer is formed on the support.

Suitable support material comprises temporary and permanent (functional) support materials. Suitable temporary support material for a self-supporting coating or a coating which can be transferred from the support comprises all materials in web form from which the dried separator can be detached again. The support may consist of film or paper, for example, and may have one or more coatings. Preferred in particular are coatings which permit controlled attachment and detachment of the separator, examples being so-called release or antiblocking agents such as, for example, polyamides, amide waxes, montan waxes, polyolefin waxes, ester waxes, calcium stearate, zinc stearate, polyvinyl esters, polyacrylate copolymers, fatty acid esters, long-chain alkyl polymers, polysaccharides, polysiloxanes, and mixtures thereof. Used preferably as temporary support materials are siliconized papers or films whose surface has been modified for a certain minimum level of adhesion to the dried separator, but which allows the support to be peeled from the separator with a low force. This peel force is measured according to FTM 3 (Finat Test Methods) and is preferably at 0.1 N/50 mm to 10 N/50 mm force per unit width of specimen. Moreover, films or surfaces coated with fluorine-containing substances are suitable as temporary support materials, and also films composed of fluoropolymers.

The peeling of the dried coating from the temporary support may be carried out by hand, for example, provided the area to be removed by peeling is not great, or alternatively by machine, such as on a roll rewinder, for example. The temporary support may be recovered in this operation. It can then be used again for coating, possibly even multiply. This is preferred particularly for reasons of cost. Alternatively, after being cut to the necessary width, for example, the coated support may be employed in battery manufacture in such a way that the coating is not transferred until during battery manufacture to an electrode or between the electrodes, i.e., the cathode and anode of the battery. In that case it may be advantageous for the separator layer to adhere first to the cathode or anode, before the temporary support is removed.

Permanent/functional support materials contemplated include, in particular, sheetlike components of a lithium ion battery. As a separator layer, the coating of the invention is always to be disposed between anode and cathode. The coating may be applied directly to the cathode or the cathode material, to the anode or to the anode material. After drying, this coating then serves as a separator layer, which may be used with or without further separator layer in the battery. Further separator layers that may be used are, for example, polymeric nonwovens, examples being spunbonded nonwovens and electrospunbonded nonwovens, or conventional porous polyolefin separators, in addition to the separator coating applied to the electrode. The coating may alternatively first be applied to a functional support, which is then used with the coating as a separator in a lithium ion battery. For this purpose, the coating may be applied to one or both sides of, for example, polymeric nonwovens, examples being spunbonded nonwovens and electrospunbonded nonwovens, or conventional porous polyolefin separators, to then form a composite separator. It is important that the coating of the invention is applied uniformly, since it acts as a self-standing separator layer.

The invention therefore further relates to a coating composition for producing a separator of the invention, preferably in the above-described method of the invention, comprising a solution of at least one block copolymer having three or more polymer blocks, preferably a block copolymer as already described in detail above, and a dispersion of at least one aluminum oxide or aluminum hydroxide, preferably of an aluminum oxide or hydroxide as already described in detail above, in at least one solvent, the weight ratio of aluminum oxide or hydroxide to block copolymer being in the range from 1.5:1 to 20:1, preferably in the range from 1.75:1 to 20:1, more preferably from 2:1 to 20:1, very preferably from 2.25:1 to 20:1 or 2.25:1 to 10:1 and more particularly from 2.5:1 to 20:1 or 2.5:1 to 8:1. Preferred embodiments of this coating composition have already been described above.

Where thermoplastic polymers are used here as functional support material, this material may take on the function of battery shutdown on overheating. Porous polyolefin films in particular may be utilized for the purpose of reducing the lithium ion conductivity to an extent such that uncontrolled discharge between anode and cathode is made more difficult, in the event, for example, of an excessive withdrawal of current from the battery. For this purpose it is necessary for the conductivity of the electrolyte in the separator layer to be reduced by a factor of at least 100. This is accompanied by a sharp drop in the Gurley porosity, with the air permeability as measured by the Gurley method climbing to at least 10 000 s per 100 ml. This shutdown effect can be controlled via the melting point and the melting characteristics of the polymers used. In the case of polyethylene, shutdown temperatures of 80° C. to 130° C. are possible, for example; in the case of polypropylene, of 120° C. to 150° C. This range can be varied through a suitable selection of the polymers and copolymers and/or by mixing thereof.

The separators of the invention feature a high mechanical strength. The mechanical strength of the porous layer ensures that it tears neither during manufacture of the battery nor in application of the battery. The elongation at break is preferably at least 5%, more preferably at least 10%, and very preferably at least 20%. The modulus of elasticity of the coatings of the invention in the self-supporting state is preferably at least 50 N/mm$^2$, preferably more than 100 N/mm$^2$.

Despite the fact that the block copolymers used as binders are largely hydrophobic, wetting of the separators with liquids such as water, other suitable solvents, or electrolyte, as for example with a 1:1 mixture of ethylene carbonate and dimethyl carbonate with 1 mol/l lithium hexafluorophosphate, occurs spontaneously; in other words, when a drop of this kind is applied to the porous layer, this layer is immediately wetted, and a spreading of the drop is observed. If the layer is self-supporting, the solvent strikes through immediately to the reverse of the layer, with the liquid fully penetrating the porous structure.

Whereas conventional polyolefin-based separators contract by several percent within an hour at 90° C., in machine and/or cross direction relative to the running of the web in the production process, depending on production process, the separators of the invention exhibit a significantly lower contraction in both machine and cross directions, of preferably less than 0.5%. If the porous layer has been applied to a functional support material, such as a nonwoven or a polyolefin separator, the resultant multi-ply separator also exhibits less contraction than the support material alone. The contraction may additionally be varied by exposure to solvents and by drying of the layer, in particular under conditions of low web tension. A multi-ply separator of the invention, comprising the porous coating and a (likewise porous) polyolefin support material, exhibits contraction under the above-specified conditions of preferably less than 3%, more particularly less than 1%, in machine and cross directions.

Furthermore, the porous layer is stable in typical electrolytes of lithium ion batteries, particularly with respect to organic carbonate solvents, such as dimethyl carbonate, ethyl methyl carbonate, vinyl carbonate, diethyl carbonate, etc., and also with respect to the lithium salts used, such as lithium hexafluorophosphate, for example. On contact with the electrolyte there is in particular no observation of deformation, dissolution, or discoloration of the porous layer.

Since the porous layer is temperature-stable, the separators of the invention can be heated for short periods to temperatures in the range from 100° C. to 200° C., preferably from 120° C. to 150° C., in order to remove adsorbed water, by means of hot air or microwave heating, for example, also optionally under reduced pressure or in vacuum. Accordingly, the solvent used in the production method can be removed, and the amount of water introduced into a battery by the separator can be minimized, as it may lead to decomposition of the electrolyte, the anode and/or the cathode. Heating may be carried out, for example, shortly before the battery components are assembled.

On account of the high porosity and the through-going pore structure, the separators have a low resistance toward lithium ions, expressed in characteristic form by a low McMullin number of less than 12. This number is calculated from the ratio of the specific conductivities of electrolyte and of electrolyte-filled separator (S. S. Zhang *Journal of Power Sources* 2007, 164, 351-364). A number of less than 12 is a target, in order to ensure the transport of lithium ions through the separator in lithium ion cells.

The separator of the invention is therefore also suitable particularly for use in a lithium ion battery. The present invention accordingly further relates to a lithium ion battery comprising at least one anode, at least one cathode, and at least one separator of the invention, and also advantageously at least one electrolyte.

Lithium ion batteries in the sense of the present invention encompass all electrochemical cells in which lithium can be transported reversibly between anode material and cathode material—in particular, rechargeable batteries. These cells are particularly suitable for rechargeable batteries. They may comprise as cathode material $LiCoO_2$, $LiFePO_4$, or $LiNi_{0.33}Co_{0.33}Mn_{0.33}O_2$ (NMC), for example, and as anode material metallic lithium or lithium/graphite intercalation compounds, which in general have been applied to a metallic current conductor, such as a copper foil or aluminum foil, for example. For the separation of cathode and anode, at least one separator of the invention is then inserted over the full area between cathode and anode, in order to prevent direct contact between the electrodes. To ensure the transport of lithium ions in the battery, the voids (pores) of the anode, cathode, and separator layer(s) are filled with an electrolyte and thereby electrochemically connected. These electrolytes generally comprise organic solvents in which lithium salts are dissolved.

The properties reported in connection with the invention are determined by the following methods:

Wetting: the wetting is determined by the method described in NASA Report NASA/TM-201 0-216099 "Battery Separator Characterization and Evaluation Procedures for NASA's Advanced Lithium-Ion Batteries"; May 2010. The wetting and penetration is observed of a drop of the electrolyte liquid applied to the separator surface. Spontaneous wetting is optimum.

Mechanical strength: Measurements are made of tensile strength (breaking load), elongation at break, and modulus of elasticity in accordance with ASTM 882-02 (ASTM D-638), as also described in S. S. Zhang *Journal of Power Sources* 2007, 164, 351-364.

Gurley air permeability: the air permeability of the separator is determined by the Gurley method of ASTM D726, as described in S. S. Zhang *Journal of Power Sources* 2007, 164, 351-364. The Gurley number, expressed in seconds per 100 ml of air volume, is a measure of tortuosity and diameter of the pores.

Porosity: the porosity (void volume) and the pore size distribution are determined by means of mercury porosimetry according to DIN 66133.

Thermal contraction: the contraction under temperature load is determined by length measurement before and after storage in a vacuum drying cabinet at 90° C. for 60 minutes and at 150° C. for 5 minutes, as described in S. S. Zhang *Journal of Power Sources* 2007, 164, 351-364, with measurement in the coating direction and transversely to the coating direction.

Electrochemical Test

An electrochemical cell with an area of approximately 2 $cm^2$ is constructed from a cathode consisting of aluminum foil, coated on one side with active cathode material NCM ($LiNi_{0.33}Co_{0.33}Mn_{0.33}$ $O_2$), PVDF binder (polyvinylidene fluoride) copolymer, and small fractions of conductive carbon black, from an anode consisting of lithium metal foil, and from the separator under test. The separator is dried in vacuum at 120° C. for 24 hours and, in the construction of the cell, at an atmospheric humidity of 50 ppm, is disposed between active cathode material and lithium foil in such a way that the separator overhangs the cathode and anode. Following addition of a sufficient amount of electrolyte (1 M $LiPF_6$ in 1:1 ethylene carbonate/diethyl carbonate) to the side of this arrangement, the electrolyte is left to act for at least one hour, in order fully to wet the cathode, the separator, and the anode, and to fill the pores. Where necessary, excess liquid is removed. This arrangement is provided with external conductors, which are electrically connected to a current cycling apparatus from Maccor (Tulsa, Okla., USA). The initial charging capacity of this cell is about 250 mAh/g. With a charging and discharging current of 0.2 C, the electrochemical cell is first cycled three times at room temperature in order to condition the battery. To assess the suitability of the separator used, the residual charging capacity in percent is then determined after 50 cycles at 0.2 C. This figure is a measure of the stability of the electrochemical cell. In this test, conventional porous polyolefin separators achieve at least 80% residual charging capacity.

EXAMPLES

Example 1

2.5 g of dodecylbenzenesulfonic acid are dissolved in 70 ml of toluene. Stirred into this solution for two hours are 31.5 g of boehmite pigment having a crystallite size of about 40 nm, a BET surface area of 100 m$^2$/g, and an $Al_2O_3$ content of about 80%. The liquid is subsequently dispersed using a bead mill, to give a colloidal dispersion having an average particle size in the dispersion of about 350 nm, determined by means of laser diffraction.

A binder solution comprising Kraton G 1651 EU, a linear SEBS triblock copolymer (styrene-ethylene/butylene-styrene) with a fraction of styrene end blocks of about 31.5% (manufacturer: KRATON, molecular weight: about 240 000, melt index <1 g/10 min at 230° C./5 kg), is prepared by heating the polymer under reflux in toluene at a concentration of 10 wt %.

53.7 g of the pigment dispersion are introduced initially, and then 26.3 g of the binder solution are added with stirring, to form a coating material having a solids content of about 25.2% with a pigment-binder ratio of 6.7:1 (corresponding to a pigment fraction of 87%).

The coating material is applied using a laboratory coating bench (Erichsen Coatmaster, Erichsen GmbH & Co. KG, Hermer, Germany) to a temporary Sappi Ultracast Adva Patina Paper (Sappi Fine Paper Europe S.A., Brussels, Belgium) support in such a way that the drying of the solvent leaves a coating having a thickness of about 20 μm.

This coating can be easily peeled by hand from the support paper. The FTM3 peel force is 1.4 N/50 mm. The separator, which is then self-supporting, is characterized physically and electrochemically.

The separator 20 μm thick has a modulus of elasticity of 140 N/mm$^2$ in machine direction (coating direction) and 145 N/mm$^2$ in cross direction, an elongation at break of 27% (MD) and 21% (CD), and a breaking load of 2.4 N/mm$^2$ (MD) and 2.6 N/mm$^2$ (CD).

One drop of an electrolyte (1 M LiP F$_6$ in 1:1 ethylene carbonate/diethyl carbonate), applied to one of the sides of the porous separator, wets it spontaneously. The Gurley air permeability is 800 s/100 ml. The average pore size is 80 nm, and the total porosity is 48%, measured by means of mercury porosimetry according to DIN 66133.

No contraction was observed over 60 minutes at 90° C. Within the bounds of measurement accuracy, therefore, the contraction is below 0.1%. Even over 5 minutes at 150° C., no visible change to the separator is observed.

In an NMC/separator/Li cell with the porous separator, a decrease in the charging capacity by only 3%, to 97% of the original capacity, was observed after 50 cycles in the above-described battery test.

Example 2

150 g of boehmite pigment in accordance with example 1 are dried at 150° C. for 4 hours. The pigment, after this preliminary drying, is slurried or predispersed in 750 ml of anhydrous p-xylene, using an ultrasound homogenizer. This mixture is heated to reflux, and 110 g of phenylmethyldimethoxysilane are added dropwise. The mixture is then heated at reflux for 10 hours. Thereafter, 60 ml of ethanol are added and the reaction solution is severely concentrated on a rotary evaporator. After twofold addition of toluene and distillative removal on a rotary evaporator each time, the material is dispersed on a bead mill, to give a colloidal dispersion having an average particle size in the dispersion of about 350 nm (laser diffraction).

This pigment dispersion is subsequently admixed with the binder solution from example 1, with stirring, to give a coating material having a solids content of about 13% with a pigment-binder ratio of 3.57:1 (78% pigment fraction).

The coating material is applied using a laboratory coating bench (Erichsen Coatmaster) to a temporary support as in example 1 in such a way that the drying of the solvent leaves a coating having a thickness of about 18 μm.

This coating can be easily peeled by hand from the support paper. The FTM3 peel force is 2.0 N/50 mm. The separator, which is then self-supporting, is characterized physically and electrochemically.

The separator 20 μm thick has a modulus of elasticity of 210 N/mm$^2$ in machine direction (coating direction) and 195 N/mm$^2$ in cross direction, an elongation at break of 20% (MD) and 18% (CD), and a breaking load of 3.5 N/mm$^2$ (MD) and 3.6 N/mm$^2$ (CD).

One drop of an electrolyte (1 M LiP F$_6$ in 1:1 ethylene carbonate/diethyl carbonate), applied to one of the sides of the porous separator, effects spontaneous wetting. The Gurley air permeability is 1200 s/100 ml. The average pore size is 75 nm and the total porosity is 43%.

No contraction was observed over 60 minutes at 90° C. Within the bounds of measurement accuracy, therefore, the contraction is below 0.1%. Even over 5 minutes at 150° C., no visible change to the separator is observed.

In an NMC/separator/Li cell with the porous separator, a decrease in the charging capacity by only 6%, to 94% of the original capacity, was observed after 50 cycles in the above-described battery test.

What is claimed is:

1. A separator for an electrochemical cell comprising:
    a porous layer which comprises at least one block copolymer having three or more polymer blocks and at least one aluminum oxide or aluminum hydroxide, the weight ratio of the aluminum oxide or the aluminum hydroxide to the block copolymer being in a range from 1.5:1 to 20:1,
    wherein the at least one aluminum oxide or aluminum hydroxide comprises boehmite,
    wherein the block copolymer has an ISO 1133 melt flow index of less than 3 g/10 min at 230° C. (5 kg), and
    wherein the block copolymer contains end polymer blocks and middle polymer block or blocks and the monomers of the end and middle block or blocks are selected from the group containing methyl (meth)acrylates, ethyl (meth)acrylates, n-propyl (meth)acrylates, n-butyl (meth)acrylates, tert-butyl (meth)acrylates, n-hexyl (meth)acrylates, 2-phenoxyethyl (meth)acrylates, decyl (meth)acrylates, 2-ethylhexyl (meth)acrylates, hexyl (meth)acrylates, hexadecyl (meth)acrylates, isobutyl (meth)acrylates, isopropyl (meth)acrylates, octadecyl (meth)acrylates; propyl (meth)acrylates, tetradecyl (meth)acrylates, vinyl benzoates, hydroxyethyl (meth)acrylates, acrylic acid, methacrylic acid, crotonic acid, isocrotonic acid, maleic acid, maleic anhydride, styrene, methylstyrene, butylstyrene, propylstyrene, 4-tert-butoxystyrene, 4-tert-butylstyrene, 2,5-dimethylstyrene, 2-methoxystyrene, ethylene, propylene, butylene, isoprene, butadiene, 1-hexene, ethylene oxide, and propylene oxide.

2. The separator as claimed in claim 1, wherein the porous layer has a thickness, and the thickness of the porous layer is in a range of 1 to 100 μm.

3. The separator as claimed in claim 1, wherein the porous layer has a porosity and a pore diameter, and the porosity of the layer is in a range of 30% to 70%, and/or the pore diameter is in a range of 10 nm to 300 nm, in each case measured by means of mercury porosimetry in accordance with DIN 66133.

4. The separator as claimed in claim 1, wherein the aluminum oxide or aluminum hydroxide comprises particles having a surface, and the surface of the aluminum oxide or aluminum hydroxide is modified to increase the dispersibility of aluminum oxide or aluminum hydroxide particles in solvents by treatment with at least one substance selected from the group containing organic compounds containing carboxylic and/or sulfonic acid, inorganic acids, silanes, or mixtures thereof.

5. The separator as claimed in claim 1 wherein the block copolymer contains end polymer blocks and a middle polymer block or blocks, and the end polymer blocks have a higher glass transition temperature ($Tg_E$) than a glass transition temperature of the middle polymer block or blocks ($Tg_M$).

6. The separator as claimed in claim 1 wherein the block copolymer contains end polymer blocks and middle polymer block or blocks, and wherein the end polymer blocks are identical or different from each other and are different from the middle polymer block or blocks.

7. The separator as claimed in claim 1, wherein the separator is a self-supporting separator with a self-supporting porous layer, and wherein a modulus of elasticity of the self-supporting porous layer is greater than 50 N/mm² and/or an elongation at break is greater than 5%.

8. The separator as claimed in claim 1, wherein the separator is on a substrate.

9. The separator as claimed in claim 1, wherein the separator is a separator of a lithium ion battery.

10. A method for producing a separator for an electrochemical cell, comprising:
producing a porous layer comprising at least one block copolymer having three or more polymer blocks and at least one aluminum oxide or aluminum hydroxide, the weight ratio of the aluminum oxide or the aluminum hydroxide to the block copolymer being in a range from 1.5:1 to 20:1, wherein the at least one aluminum oxide or aluminum hydroxide comprises boehmite, and wherein the block copolymer has an ISO 1133 melt flow index of less than 3 g/10 min at 230° C. (5 kg), and wherein the block copolymer contains end polymer blocks and middle polymer block or blocks and the monomers of the end and middle block or blocks are selected from the group containing methyl (meth)acrylates, ethyl (meth)acrylates, n-propyl (meth)acrylates, n-butyl (meth)acrylates, tert-butyl (meth)acrylates, n-hexyl (meth)acrylates, 2-phenoxyethyl (meth)acrylates, decyl (meth)acrylates, 2-ethylhexyl (meth)acrylates, hexyl (meth)acrylates, hexadecyl (meth)acrylates, isobutyl (meth)acrylates, isopropyl (meth) acrylates, octadecyl (meth)acrylates; propyl (meth) acrylates, tetradecyl (meth)acrylates, vinyl benzoates, hydroxyethyl (meth)acrylates, acrylic acid, methacrylic acid, crotonic acid, isocrotonic acid, maleic acid, maleic anhydride, styrene, methylstyrene, butylstyrene, propylstyrene, 4-tert-butoxystyrene, 4-tert-butylstyrene, 2,5-dimethylstyrene, 2-methoxystyrene, ethylene, propylene, butylene, isoprene, butadiene, 1-hexene, ethylene oxide, and propylene oxide, comprising the following steps:
providing a coating composition comprising at least one solvent, a dispersion of aluminum oxide or aluminum hydroxide particles comprising boehmite in this solvent, and a solution of the block copolymer,
applying the coating composition to a substrate, to give a coating on the substrate, and
curing the coating by evaporating the solvent and optionally crosslinking the polymer.

11. The method as claimed in claim 10, wherein the solvent has a boiling point in a range of about 60° C. to about 250° C.

12. The method as claimed in claim 10, wherein the aluminum oxide or aluminum hydroxide particles have an average particle size in a range from 50 nm to 2000 nm.

13. A coating composition for producing a separator comprising:
a solution of at least one block copolymer having three or more polymer blocks and a dispersion of at least one aluminum oxide or aluminum hydroxide in at least one solvent, the weight ratio of the aluminum oxide or the aluminum hydroxide to the block copolymer being in a range from 1.5:1 to 20:1,
wherein the at least one aluminum oxide or aluminum hydroxide comprises boehmite,
wherein the block copolymer has an ISO 1133 melt flow index of less than 3 g/10 min at 230° C. (5 kg), and
wherein the block copolymer contains end polymer blocks and middle polymer block or blocks and the monomers of the end and middle block or blocks are selected from the group containing methyl (meth)acrylates, ethyl (meth)acrylates, n-propyl (meth)acrylates, n-butyl (meth)acrylates, tert-butyl (meth)acrylates, n-hexyl (meth)acrylates, 2-phenoxyethyl (meth)acrylates, decyl (meth)acrylates, 2-ethylhexyl (meth)acrylates, hexyl (meth)acrylates, hexadecyl (meth)acrylates, isobutyl (meth)acrylates, isopropyl (meth) acrylates, octadecyl (meth)acrylates; propyl (meth) acrylates, tetradecyl (meth)acrylates, vinyl benzoates, hydroxyethyl (meth)acrylates, acrylic acid, methacrylic acid, crotonic acid, isocrotonic acid, maleic acid, maleic anhydride, styrene, methylstyrene, butylstyrene, propylstyrene, 4-tert-butoxystyrene, 4-tert-butylstyrene, 2,5-dimethylstyrene, 2-methoxystyrene, ethylene, propylene, butylene, isoprene, butadiene, 1-hexene, ethylene oxide, and propylene oxide.

14. The separator as claimed in claim 1, wherein the aluminum oxide or aluminum hydroxide comprises particles having a surface, and the surface of the aluminum oxide or aluminum hydroxide is modified to increase the dispersibility of aluminum oxide or aluminum hydroxide particles in solvents by treatment with a substance selected from the group consisting of branched and unbranched alkylarylsulfonic acids, branched and unbranched, linear and cyclic alkylsulfonic acids, branched and unbranched, linear and cyclic, aliphatic and aromatic monocarboxylic, dicarboxylic, and polycarboxylic acids, fluorine-containing acids, amidosulfonic acids, bis(oxalato)boric acid, hydrofluoric acid, hydrochloric acid, nitric acid, phosphoric acid, sulfuric acid, $HBF_4$, $HPF_6$, $HClO_4$, and silanes of the structure $SiR^1R^2R^3R^4$, in which $R^1$ represents alkoxy, $R^2$ and $R^3$ may be identical or different, and represent alkyl, aryl or alkoxy, and $R^4$ represents alkyl or aryl, or mixtures thereof.

15. The separator as claimed in claim 4 wherein the glass transition temperature of the end polymer blocks ($Tg_E$) is more than 70° C., and the glass transition temperature of the middle polymer block or blocks ($Tg_M$) is less than 70° C.

16. The method of claim 11 wherein the solvent is selected from the group consisting of water, alcohols, esters, ethers, ketones, amides, and aliphatic and aromatic solvents.

17. The separator as claimed in claim 2, wherein the thickness of the porous layer is in a range of 3 to 50 µm.

18. The separator of claim 1 wherein the block copolymer is selected from the group consisting of styrene-isoprene-styrene triblock copolymer (SIS), styrene-butene-styrene triblock copolymer (SBS), styrene-ethylene/butene-styrene triblock copolymer (SEBS), styrene-ethylene/propene-styrene triblock copolymer (SEPS), styrene-ethylene-ethylene/propene-styrene block copolymer (SEEPS), tert-butylstyrene-ethylene/propylene-sulfonated styrene-ethylene/propylene-tert-butylstyrene block copolymer, methyl methacrylate-butyl acrylate-methyl methacrylate triblock copolymer, methyl methacrylate-butadiene-styrene triblock copolymer, acrylic acid-ethylene-acrylic acid triblock copolymer, methyl methacrylate-ethylene oxide-methyl methacrylate triblock copolymer, or mixtures thereof, which may optionally have been crosslinked.

19. The separator as claimed in claim 1, wherein the aluminium oxide or aluminium hydroxide comprises particles having a surface, and the surface of the aluminium oxide or aluminium hydroxide is modified to increase the dispersibility of aluminium oxide or aluminium hydroxide particles in solvents by treatment with at least one substance selected from the group containing organic compounds containing carboxylic acids, inorganic acids, silanes, or mixtures thereof.

20. The separator of claim 1 wherein the block copolymer is selected from the group consisting of styrene-butene-styrene triblock copolymer (SBS), styrene-ethylene/butane-styrene triblock copolymer (SEBS), styrene-ethylene/propene-styrene triblock copolymer (SEPS), styrene-ethylene-ethylene/propene-styrene block copolymer (SEEPS), tert-butylstyrene-ethylene/propylene-sulfonated styrene-ethylene/propylene-tert-butylstyrene block copolymer, methyl methacrylate-butyl acrylate-methyl methacrylate triblock copolymer, methyl methacrylate-butadiene-styrene triblock copolymer, acrylic acid-ethylene acrylic acid triblock copolymer, methyl methacrylate-ethylene oxide-methyl methacrylate triblock copolymer, or mixtures thereof, which may optionally have been crosslinked.

* * * * *